United States Patent
Burström et al.

(10) Patent No.: US 9,451,553 B2
(45) Date of Patent: Sep. 20, 2016

(54) METHOD AND ARRANGEMENT FOR LOAD SHARING POWER CONTROL

(75) Inventors: Per Burström, Luleå (SE); Anders Furuskär, Stockholm (SE); Arne Simonsson, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 904 days.

(21) Appl. No.: 13/695,481

(22) PCT Filed: Apr. 30, 2010

(86) PCT No.: PCT/SE2010/050476
§ 371 (c)(1),
(2), (4) Date: Oct. 31, 2012

(87) PCT Pub. No.: WO2011/136709
PCT Pub. Date: Nov. 3, 2011

(65) Prior Publication Data
US 2013/0051352 A1    Feb. 28, 2013

(51) Int. Cl.
| H04W 52/14 | (2009.01) |
| H04W 52/18 | (2009.01) |
| H04W 52/26 | (2009.01) |

(52) U.S. Cl.
CPC .......... *H04W 52/146* (2013.01); *H04W 52/18* (2013.01); *H04W 52/265* (2013.01)

(58) Field of Classification Search
CPC H04W 52/146; H04W 52/18; H04W 52/265
USPC ........................................ 370/318, 329, 330
See application file for complete search history.

(56) References Cited

U.S. PATENT DOCUMENTS

| 2002/0160777 | A1* | 10/2002 | Takao et al. ................ 455/436 |
| 2008/0161033 | A1* | 7/2008 | Borran .................. H04W 52/16 455/522 |
| 2008/0188260 | A1 | 8/2008 | Xiao et al. |
| 2009/0147748 | A1* | 6/2009 | Ofuji et al. .................. 370/330 |
| 2010/0041428 | A1* | 2/2010 | Chen et al. .................. 455/522 |

(Continued)

FOREIGN PATENT DOCUMENTS

| CN | 1808934 A | 7/2006 |
| EP | 1 339 175 | 8/2003 |

(Continued)

OTHER PUBLICATIONS

English Summary of Japanese Office Action mailed Feb. 14, 2014 in Japanese Application No. 2013-507910.
International Search Report for PCT/SE2010/050476, mailed Jun. 24, 2011, (7 pages).

(Continued)

*Primary Examiner* — Mark Rinehart
*Assistant Examiner* — Natali N Pascual Peguero

(57) ABSTRACT

A method for uplink power control at a mobile station which is served by a base station of a communications network comprising a plurality of base stations is provided where the power spectrum density of the mobile station is adaptable based on the bandwidth scheduled to the mobile station. The suggested power spectrum adaptation is obtained by providing for a switch to an alternative power control mode which enables for transmit power boosting at the mobile station. The decision whether to apply the suggested power spectrum adaptation can be made at the base station which is serving the mobile station, or at a selected mobile station.

31 Claims, 8 Drawing Sheets

(56) References Cited

U.S. PATENT DOCUMENTS

| | | | |
|---|---|---|---|
| 2011/0170518 A1* | 7/2011 | Randriamasy et al. | 370/331 |
| 2011/0176497 A1* | 7/2011 | Gopalakrishnan | 370/329 |

FOREIGN PATENT DOCUMENTS

| | | |
|---|---|---|
| EP | 1 385 276 | 1/2004 |
| WO | WO 2007/112142 | 10/2007 |
| WO | WO 2008/030897 | 3/2008 |
| WO | WO 2008/042187 | 4/2008 |
| WO | WO 2008/055179 | 5/2008 |
| WO | WO 2008/072083 | 6/2008 |
| WO | WO 2010/018433 | 2/2010 |
| WO | WO 2010/018434 | 2/2010 |

OTHER PUBLICATIONS

Written Opinion of the International Searching Authority for PCT/SE2010/050476, mailed Jun. 24, 2011, (19 pages).

International Preliminary Report on Patentability for PCT/SE2010/050476, mailed Sep. 21, 2012, (20 pages).

Boussif, M. et al., "Load adaptive power control in LTE Uplink", Wireless Conference (EW), (Apr. 12, 2010), pp. 288-293.

"$3^{rd}$ Generation Partnership Project: Technical Specification Group Radio Access Network; Evolved Universal Terrestrial Radio Access (E-UTRA); Physical Layer Procedures (Release 8)", 3GPP Standard, No. V8.3.0, (May 1, 2008), pp. 1-47.

NTT Docomo: "Link Adaptation Method in Evolved UTRA Uplink", 3GPP Draft, vol. RAN WG1, No. Seoul, KR, (Nov. 1, 2006), 6 pages.

\* cited by examiner

METHOD AND ARRANGEMENT FOR LOAD SHARING POWER CONTROL

This application is the U.S. national phase of International Application No. PCT/SE2010/050476, filed 30 Apr. 2010, which designated the U.S., the entire contents of which is hereby incorporated by reference.

TECHNICAL FIELD

The present invention relates generally to a power control method and an arrangement suitable for executing the power control method.

BACKGROUND

In a typical mobile communications system, the data rate experienced by a user is normally determined by the bandwidth which has been allocated, or scheduled, to the user in combination with the signal quality achieved within the scheduled bandwidth.

Both scheduling and power control may be used to control fairness, or the spreading of experienced bit rate between users served by the mobile communications system. In the uplink (UI) power control may be applied such that when the transmit power is reduced for users located near a base station an increase in performance for users located far from the base station is obtained at the cost of a slight degradation in the overall system throughput.

In a typical mobile communications system which rely on a protocol, such as e.g. High Speed Downlink Packet Access (HSDPA) or Long Term Evolution (LTE), only scheduling in combination with a fixed transmit power is used in the downlink (DL), while power control is used in the UL.

In LIE an ULopen loop power control mechanism regulates the transmit power of mobile stations on the basis of path loss, striving to keep the Power Spectrum Density (PSD) at the base station receiver at a constant level, irrespective of how much bandwidth that has been scheduled to the mobile station. The transmit power, $F_{tx}$, for a mobile station on the Physical ULShared Channel (PUSCH) may be expressed with the following formula:

$$P_{tx} = \min\{P_{MAX} 10 \log_{10}(M_{PUSCH}) + P_O + \alpha \cdot PL\}[\text{dBm}] \quad (1)$$

where $F_{MAX}$ is the maximum transmit power while $M_{PUSCH}$ is the bandwidth scheduled to the mobile station, where the bandwidth is given as a number M of scheduled Resource Hocks (Ms), where M>=1. $F_O$ is an estimation of the target received power per RB for users with PL=0, where PL is the path loss between the mobile station and the base station. $\alpha$ is a parameter used for controlling to what extent the path loss is compensated for. The bandwidth $M_{PUSCH}$ can be compensated for to maintain a constant PSD at the base station receiver.

US20080188260 A1 refers to a method and apparatus for providing UL power control in a communication system, where according to one exemplary embodiment, cell edge performance and spectral efficiency may be optimized by measuring at least one system performance metric at a first Node B. The first Node B communicates the one or more measured metrics to other Node Bs and receives one or more corresponding metrics from the other Node Bs. On the basis of the one or more system performance metrics measured by the first Node B and the other neighboring Node Bs an adaptive power control parameter is determined and used for updating an ULtransmit power level for at least one mobile station served by the first Node B. Consequently US20080188260 A1 relies on input based on metrics which have been measured at nodes other than the first Node B.

Methods for avoiding overload during power control represent a well known technique. U.S. Pat. No. 7,620,004 B2 refers to methods of power overload control in communication systems where the SIRtarget is adopted to avoid overload. According to one exemplary embodiment a method of providing power overload control in a communication system having at least one base station serving one or more users of at least one cell is described. A target Signal-to-Interference-Ratio ($SIR_{target}$) may be controlled for inner loop power control implemented by the base station, so as to maintain the loading of the communication system below an overload condition.

It is a well known fact that scheduling can only control fairness within one single cell. To achieve fairness across a plurality of cells, scheduling only works if there is an equal number of users in each cell. However, in real systems, the number of active users varies both over time and between cells. Under such conditions the users with the lowest bit rate often suffer from a combination of bad radio conditions and a high cell load. FIG. 1 is a schematic illustration of the PSD at a mobile station, where a bandwidth (BW) has been scheduled the mobile station. More specifically, in theory, the bit rate (R) of a mobile station depends on the scheduled BW and the resulting signal quality (SNR), such that $$R = BW \cdot \log_2(1 + SNR) \quad (2)$$

FIG. 2a illustrates a typical scenario where eight mobile stations are served by a first base station 200a, while a second, neighboring base station 201a is serving only two mobile stations. As indicated in the two diagrams of FIG. 2a, where each of these diagrams is illustrating the PSD of a respective cell, the mobile stations served by base station 200a are each scheduled resources having a relatively narrow bandwidth, while each of the mobile stations served by base station 201a can be scheduled considerably more bandwidth, thereby enabling the mobile stations of cell 201a to make better use of the available resources and to obtain a better data throughput The bandwidth allocation is normally controlled by a scheduler, while the signal quality is controlled by a power control mechanism. In the described scenario, however, the scheduler will have a limited possibility to improve the fairness between the users. None of the power control schemes mentioned above addresses this problem.

SUMMARY

An object of the present document is to address at least some of the problems outlined above. In particular, it is an object of the present document to provide a solution that enables mobile stations to better cope with changing traffic conditions.

These objects and others may be obtained by applying a method, and a base station or a mobile station according to the attached independent claims.

According to one aspect, a method for uplink power control at a mobile station which is served by a base station of a communications network comprising a plurality of base stations is provided, where the power spectrum density of the mobile station is adaptable based on the bandwidth scheduled to the mobile station.

By considering the bandwidth scheduled to a mobile station during power control, a narrow bandwidth can be compensated for by adapting the power spectrum density of the mobile station. An advantage with applying such a method is that mobile stations that due to a relatively low power spectrum density would otherwise be exposed to severe interference from other mobile stations will be able to communicate with better performance, and thus a better fairness between mobile stations can be obtained.

The suggested mechanism can be obtained by considering the power spectrum density of a mobile station and by adapting the power spectrum density in case it is found that the bandwidth scheduled to the mobile station is below a minimum bandwidth, $M_{min}$.

In addition to considering the bandwidth, also other criteria may be considered. According to one exemplary embodiment the Quality of Service (QoS) of the mobile station is considered, wherein the adaptation is applied in case it is determined that in addition to the scheduled bandwidth being below $M_{min}$, the QoS of the mobile station is below a required QoS, $QoS_{req}$.

According to one exemplary embodiment the power spectrum density adaptation is based on a fixed power control mode which enables the mobile station to adjust the power spectrum density such that it utilizes a fixed minimum transmit power, $F_{min}$, in case the bandwidth scheduled to the mobile station is below the minimum bandwidth, $M_{min}$.

According to another exemplary embodiment, the power spectrum density adaptation is instead based on a non-linear power control mode which enables the mobile station to adjust the power spectrum density such that it utilizes a transmit power that is equal to or exceeds a minimum transmit power, $F_{min}$.

Both the suggested embodiments allow mobile stations to adjust the power spectrum density such that when one of the alternative power control modes are applied the transmit power is never lower than the pre-defined lower transmit power, $F_{min}$.

As an alternative to always apply full compensation, also the grade of compensation may be adaptable. More specifically, the power spectrum density adaptation may be performed partly on the basis of a pre-defined compensation parameter, $\beta$, such that full compensation for a reduced bandwidth allocation is obtained in case $\beta=1$ and such that no compensation is obtained in case $\beta=0$. By way of example, the conversation parameter may be determined by expecting the level of interference in relation to the expected bit rate, i.e. the SINR to bit rate link performance.

According to another aspect, the possibility of adapting the power spectrum density on the basis of the bandwidth scheduled to a mobile station may be controlled from a serving first base station. Such a method is initiated by recognizing that predefined criteria, to apply an alternative power control mode at the base station, is fulfilled. Once triggered the base station instruct at least one of the served mobile stations to apply the alternative power control mode.

According to one exemplary embodiment, the instructing step may comprise instructing all mobile stations served by the first base station of the option to change power control mode, wherein according to an alternative embodiment a subgroup of mobile stations may be selected from the plurality of mobile stations, wherein the instructing step comprises instructing only the mobile stations belonging to the subgroup.

According to one embodiment, the trigger may be based on the average load of the first base station and the average load of at least one neighboring base station, wherein the trigger criteria is fulfilled in case the average load of the first base station relative the average load of the at least one neighboring base station exceeds a predefined load threshold, $I_{th}$. Alternatively, only the average load of the first base station may be considered, wherein the trigger criteria is fulfilled in case the average load of the first base station exceeds a predefined load threshold, $I_{th}$.

The selection of mobile stations may be based on one or more criteria, such as e.g. the amount of bandwidth scheduled to the mobile stations, the time scheduled to the mobile stations, statistics on the amount of bandwidth scheduled to the mobile stations compared to the amount of bandwidth requested by the mobile stations, and/or mobile stations from which a power headroom exceeding zero has been reported to the first base station.

According to one embodiment, the instructing step comprises providing instructions to the at least one mobile station to switch to the alternative power control mode, i.e. the instruction is unconditional. Alternatively, the instructing step comprises providing information to the at least one mobile station which enables the at least one mobile station to apply the alternative power control mode, i.e. the final decision of whether or not to apply the alternative power control mode is taken by each respective mobile station.

Also in this case a fixed or a non-linear power control mode may be applied, depending on the circumstances. In addition full compensation, or a limited compensation, which is determined by a compensation parameter, $\beta$ may be applied by the selected alternative power control mode.

If a mobile station controlled selection mechanism is to be applied, the mobile stations have to be adapted accordingly. According to another aspect, such a mobile station which is configured to perform uplink power control when served by a base station of a communications network is provided. The mobile station according to the suggested embodiment comprises an adaptation unit which is configured to enable the mobile station to adapt the power spectrum density of the mobile station on the basis of the bandwidth scheduled to the mobile station. In addition to take the scheduled bandwidth into consideration, the adaptation unit may be configured to determine also the QoS of the mobile station and to adapt the power spectrum density on the basis of the bandwidth scheduled to the mobile station in case it is determined that the Quality of Service of the mobile station is below a required QoS, $QoS_{req}$.

In order to provide for adaptation of the power spectrum density the adaptation unit may be configured to apply a fixed or a non-linear power control mode, as described above.

In addition, the base station typically also comprises a triggering unit, which is adapted to trigger a power control unit to switch to an alternative power control mode when predefined trigger criteria has been fulfilled, wherein in response to such a trigger criteria/criterion, the power control unit is configured to instruct at least one of the mobile stations to switch to, and to apply the alternative power control mode.

Unless the base station is configured to always provide instructions to all served mobile stations, the base station may also be provided with a selecting unit which is configured to select a subgroup of mobile stations from the plurality of mobile stations served by the base station, wherein the power control unit is configured to only provide the instructions to the mobile stations belonging to the selected subgroup, and wherein the instructions may be configured to instruct selected mobile stations to switch mode unconditionally, or to allow one or more mobile stations to switch mode on the initiative of each respective mobile station.

The base station may be configured to select mobile stations on the basis of one or more predefined criteria, such as e.g. the amount of resources scheduled to the mobile stations, the time scheduled to the mobile stations, statistics on the amount of resources scheduled to the mobile stations compared to the amount of resources requested by the mobile stations, and mobile stations from which a power headroom exceeding zero has been reported to said base station.

According to one exemplary embodiment, the triggering unit is configured to determine the average load of the base station and of at least one neighboring base station, and to trigger a switch to the alternative power control mode in case the average load of the base station relative the average load of at least one neighboring base station exceeds a predefined load threshold, $I_{th}$. Alternatively, no surrounding base stations are considered, and thus the triggering unit is only considering the average load of the base station.

Further features of the present invention and its benefits can be understood from the detailed description following below.

BRIEF DESCRIWIION 0 F THE DRAWINGS

The invention is now described, by way of example, with reference to the accompanying drawings, in which FIG. 1 is an illustration of power spectrum density for a user according to the prior art.

DETAILED DESCRIPTION

In the following, an alternative power control mechanism which enables change of mode such that an adaptation of the power spectrum density (PSD) is possible at a mobile station on the basis of the bandwidth scheduled, or allocated, to the mobile station will be described in further detail. More specifically, the suggested power control mechanism is to be applied for users that have been scheduled a narrow bandwidth, which could jeopardize the bit rate available to these users if only conventional power control mechanisms were to be used. The suggested power control mechanism is typically based on a selection mechanism, which enables the mobile stations to switch to an alternative power control mode, which provides for PSD adaptation by adapting the transmit power, $F_{tx}$. Typically also the cell load is considered by the suggested power control mode selection feature, such that an alternative power control mode can be applied at cells served by base stations where the load of the cell is high, and where there are users served by the cell that have been scheduled a narrow bandwidth, i.e. a bandwidth which is below a certain predefined minimum bandwidth, $M_{min}$.

For a base station and mobile stations served by the base station which are meeting the criteria mentioned above, a proposed alternative power control mode is available which provides for an increase of a received power target of a mobile station for some or all of the served mobile stations to compensate for their narrow bandwidth. The suggested mechanism does not necessarily require any measurements to be made on any surrounding base stations but can rely on metrics measured by the service base station only.

Functionality for managing such an alternative power control mechanism may reside in the base station, which may be configured to signal new power control parameters to all or some of its users/mobile stations, all according to one or more predefined trigger criteria that is to be applied.

Alternatively, the suggested power control mechanism may instead be implemented as a terminal centric solution where one or more power control rules which is/are applied in the mobile stations may instead be adaptable directly at the mobile stations. If controlled by the mobile station, a switching criterion which is based on the scheduled bandwidth may be applied such that when the bandwidth scheduled for the mobile station is below a certain minimum level, $M_{min}$, the PSD transmitted from the mobile station can be increased to compensate for the bandwidth by boosting the transmit power of the mobile station.

Figure 1:
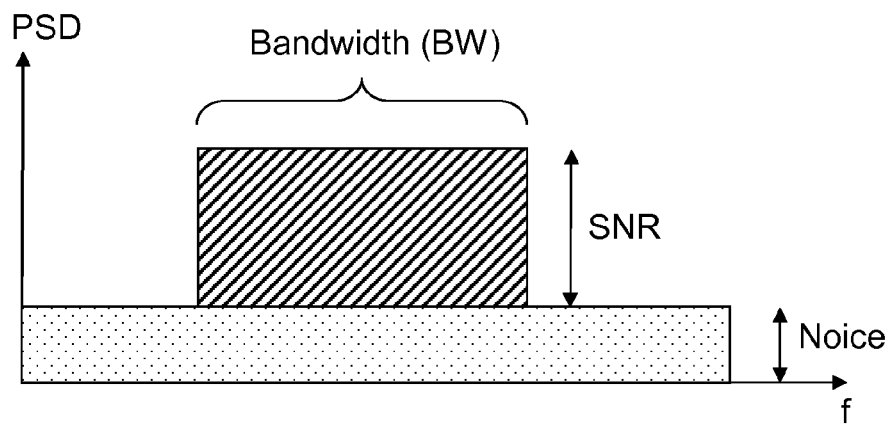
Figure 2A:
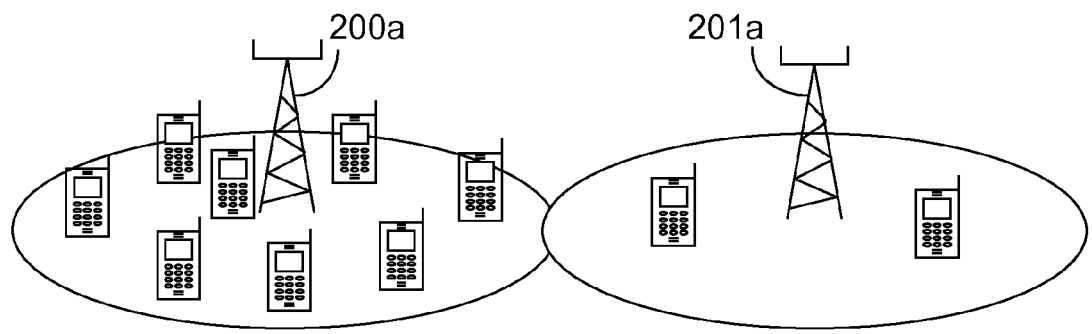
FIG. 2a is another illustration of power spectrum density for a plurality of mobile stations according to the prior art.
Figure 2A:
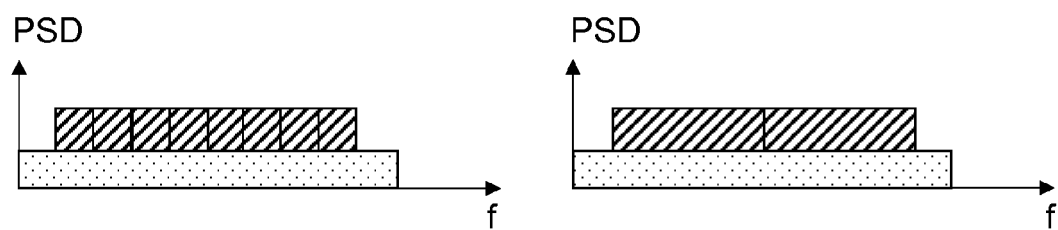
Figure 2B:
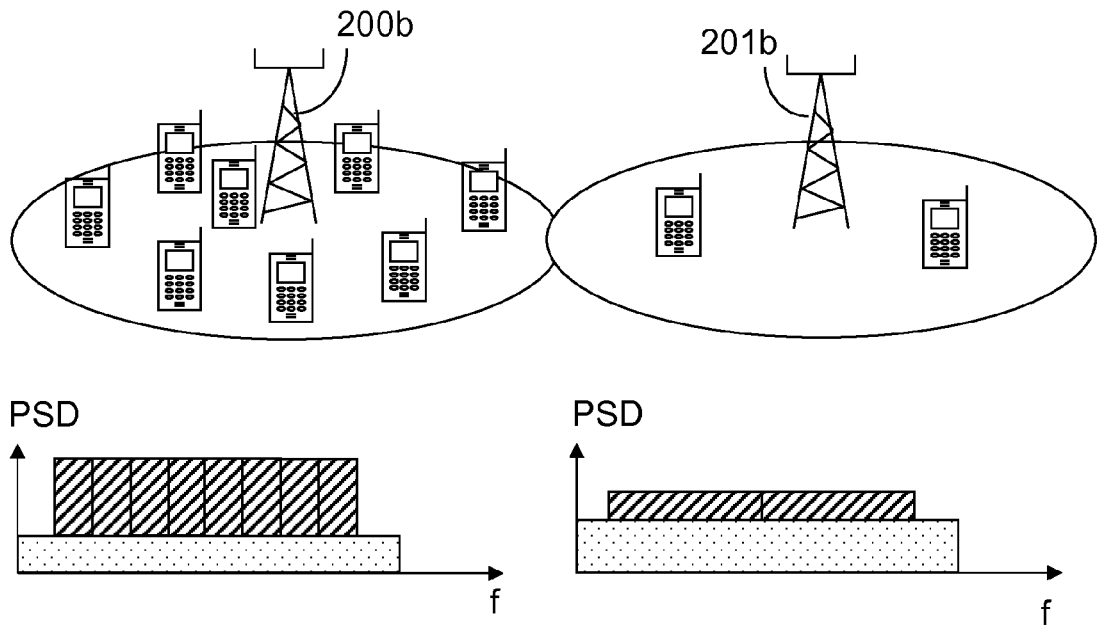
FIG. 2b is yet another illustration of power spectrum density for a plurality of mobile stations when applying an alternative power control mechanism according to one embodiment.

FIG. 2b is an illustration of a scenario, which corresponds to the scenario described above with reference to FIG. 2a. Compared to the scenario of FIG. 2a, which referred to a prior art solution, using conventional power control, the diagrams of FIG. 2b shows how a narrow bandwidth scheduled to mobile stations served by a heavily loaded base station 200b can be compensated for by boosting the transmit power of all mobile stations served by base station 200b. Even though, as is also indicated in the figure, this will cause an increase in the noise level for the mobile stations served by neighboring cells, such as base station 201b, the broader bandwidth scheduled to the mobile stations served by base station 201b will most likely be able to cope with such relatively limited interference.

A mobile communications radio network, such as e.g. LTE, has base stations, typically referred to as Node Bs, which are serving users that are normally found scattered throughout the system in the UL Even though the number of users served by a respective base station normally varies over time, the ULtraffic demands may typically remain overall high over time. In the communications radio network, all base stations continuously measure and fiber the interference experienced from other base stations to determine the most suitable ULtransmit parameters to send in downlink (DL) to the mobile stations.

In such a scenario, the suggested power control mechanism may be implemented as an option to a traditional PSD setting, such that upon recognizing that one or more predefined criteria has been fulfilled at the base station, an alternative power control mode allowing power boosting may be applied at all or some of the mobile stations served by the base station.

Figure 3:
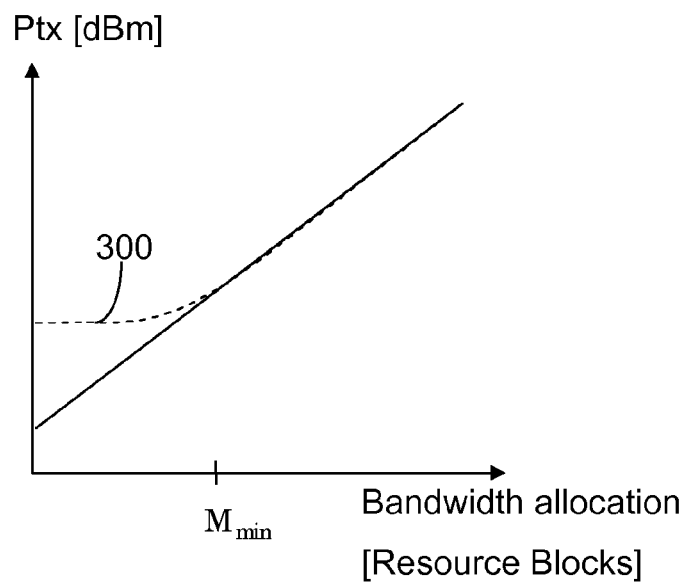
FIG. 3 is an illustration of the dependency of the transmit power versus the bandwidth allocation for an alternative power control mode according to one embodiment.

FIG. 3 is a diagram which illustrates how the transmit power, $F_{tx}$, of a mobile station may depend on the bandwidth scheduled to a mobile station when the suggested power control mechanism is applied. The scheduled bandwidth is given as a number M of scheduled resource blocks (RBs). In the figure a conventional linear $F_{tx}$/scheduled bandwidth behavior, which is given as a reference, is indicated by the solid line. As indicated in FIG. 3, PSD adaptation may be achieved by boosting $F_{tx}$ for the mobile station when the number of RBs scheduled to the mobile stations is less than a minimum number of RBs, i.e. $M<M_{min}$, according to a non-linear method indicated with the dotted line.

Figure 4:
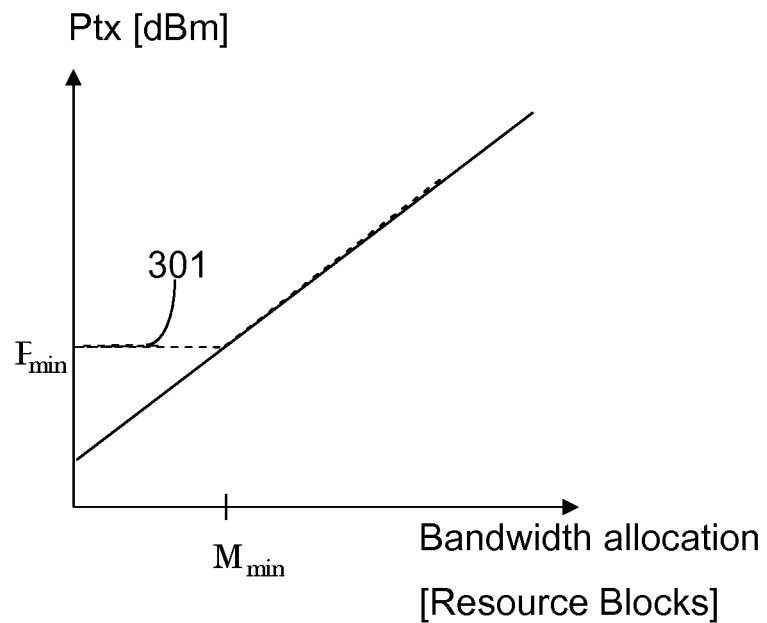
FIG. 4 is an illustration of the dependency of the transmit power versus the bandwidth allocation for an alternative power control mode according to another embodiment.

Alternatively, a method which does instead rely on a fixed power boosting rule may be applied according to FIG. 4, where a minimum transmit power, $F_{min}$, is used by the mobile station in case the bandwidth allocation is lower than $M_{min}$.

Figure 5:
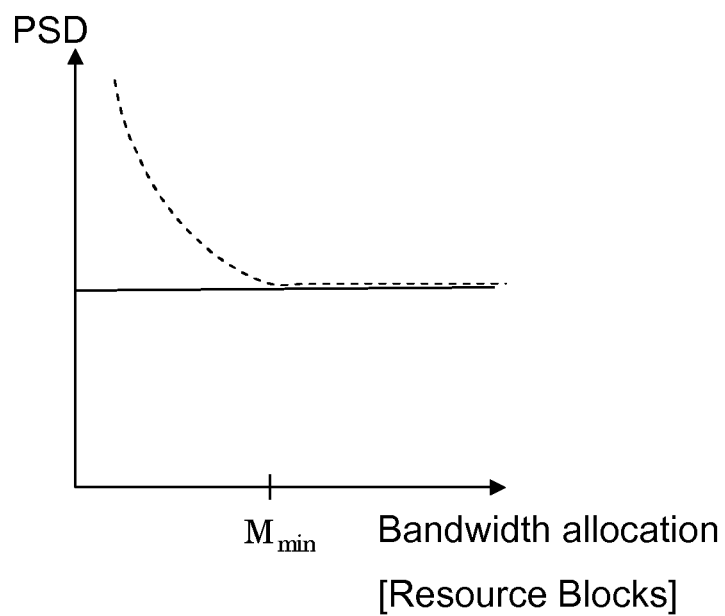
FIG. 5 is an exemplary illustration of how the PSD may depend on the scheduled bandwidth when applying any of the suggested alternative power control modes.

FIG. 5 is another diagram which illustrates how the PSD is adapted when the suggested power control mechanism is applied such that PSD can be increased for bandwidth allocations below $M_{min}$.

As mentioned above, the method for enabling selection of an alternative power control mode may be implemented in the base stations of a communications network, wherein a switch to an alternative power control mode which enables for compensation of the PSD may be triggered at a base station e.g. if the traffic load of the base station exceeds a predefined threshold value. Consequently, a base station may measure its traffic load on a continuous basis, e.g. by determining the average number of scheduled users that are being served by the base station, and if the measured load exceeds the threshold value, the base station automatically switch to a mode where some or all of the mobile stations served by the base station are allowed to boost their power output according to any of the embodiments described above with reference to FIG. 3 or 4.

The selection of which mobile stations that are to be provided with the option to switch to another power control mode may be based on the amount of scheduled resources, such that the mobile stations with the least amount of scheduled resources are selected. If the base stations employ frequency division multiplexing scheduling, this means that the mobile stations for which the smallest bandwidth has been scheduled are selected.

According to an alternative embodiment the selection may instead be based on the time scheduled to the mobile stations, such that the mobile stations for which the least amount of time has been scheduled are selected.

According to yet another embodiment, statistics on the resources, typically the amount of bandwidth may form the basis for selection of mobile stations, such that the mobile stations for which the difference between scheduled resources and requested resources differ the most are selected.

Alternatively, the available power of the mobile stations may be decisive for the selection of mobile stations, such that e.g. all mobile stations from which a power headroom exceeding zero has been reported are selected.

The suggested power control method may typically be arranged such that a switching back to conventional power control mode is automatically executed when the conditions for switching to the alternative mode are no longer fulfilled, e.g. when the load conditions on which the switching is based have shifted to a situation where the overall traffic registered by a base station is considered to be bursty, intermittent or when the system load has become low.

According to one embodiment, the selected mobile stations may be instructed by the service base station to perform an unconditional switch to an alternative power control mode in response to receiving instructions from the serving base station. Alternatively, a mobile station may be configured to make the decision on whether or not to switch to the alternative mode internally, such that once instructions have been provided to the mobile station from the serving base station a decision to switch to an alternative power control mode can be taken at the mobile station.

By way of example, when the user bit rate of a mobile station is considered to be too low to support a service due to a low amount of scheduled resources the PSD can be adjusted by increasing the transmit power, $F_{tx}$. $F_{tx}$ be described as:

$$P_{tx}=\min\{P_{MAX}10\log_{10}(M_{PUSCH})+\Delta P(M_{PUSCH})+ P_O+\alpha \cdot PL\}[dBm] \quad (3)$$

where the new berm $\Delta P(M_{PUSCH})$ is one way of expressing an alteration of the PSD, or in other words, an expression of how the PSD can be compensated for due to a too low or reduced bandwidth allocation.

According to one exemplary embodiment $\Delta P(M_{PUSCH})$, which yields the same bit rate $R_{min}$ as can be achieved when $M_{min}$ RBs has been scheduled to the mobile station, also when the number of scheduled RBs, expressed as $M_{PUSCH}$ in formula (3) is less than $M_{min}$, may be expressed as:

$$\Delta P(M_{PUSCH})=10\cdot\log_{10}(\max \{2^{Rmin/MPUSCH}-\frac{1}{2}Rmin/Mmin-1},1\}) [dBm] \quad (4)$$

According to another alternative embodiment $\Delta P(M_{PUSCH})$, which instead yields the same minimum transmit power $F_{min}$ as used for $M_{min}$ RBs, also when $M_{PUSCH}<M_{min}$, as indicated in FIG. 4, may be expressed as:

$$\Delta P(M_{PUSCH})=10\cdot\log_{10}(\max\{M_{min}/M_{PUSCH},1\}) [dBm] \quad (5)$$

If not full compensation is required, an alternative embodiment enabling for partial compensation may instead be applied. For partial compensation of the suggested bandwidth reduction mechanism any of algorithms (4) or (5) can be multiplied with a control parameter $\beta$, where $\beta$ set to 1 means full compensation, while $\beta$ set to 0 means no compensation at all. Consequently, in order to provide for partial compensation, formulas (4) and (5) can be expressed as:

$$\Delta P(M_{PUSCH})=\beta\cdot 10\cdot\log_{10}(\max \{2^{Rmin/MPUSCH}-\frac{1}{2}Rmin/Mmin-1}, 1\}) [dBm] \quad (6)$$

and $$\Delta P(M_{PUSCH})=\beta\cdot 10\cdot\log_{10}(\max\{(M_{min}/M_{PUSCH}, 1\}) [dBm] \quad (7)$$

The compensation parameter may be determined according to expected SINR to bit rate link performance, which is a measure that can be determined by the service base station by applying any conventional measuring procedure.

Figure 6:
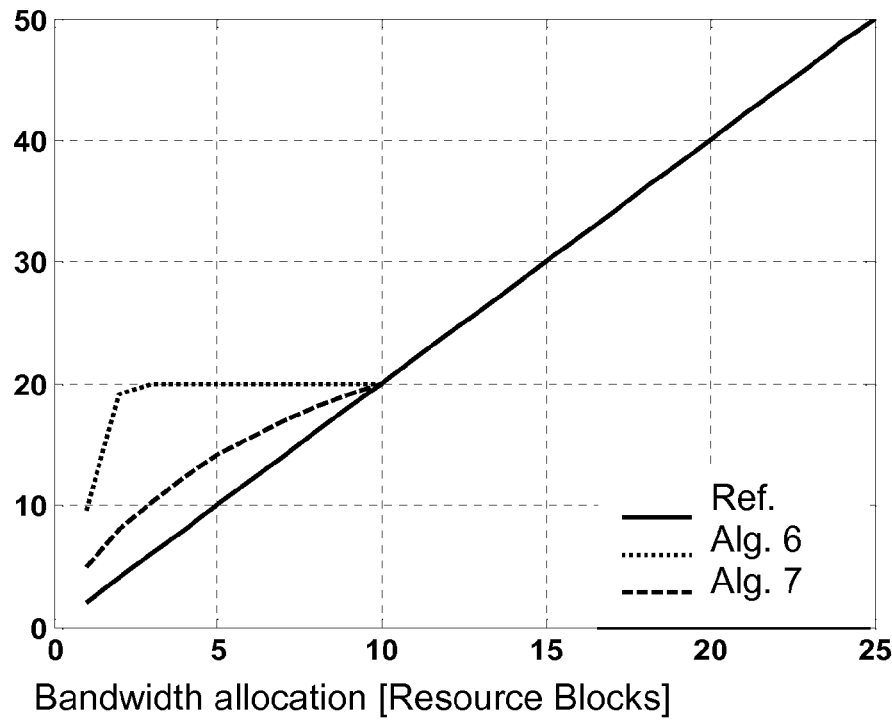
FIG. 6 is an illustration of an exemplifying simulation of an alternative fixed and a non-linear power control mode showing the dependency of the bit rate versus the bandwidth allocation.

A result from applying the two algorithms (6) and (7) with full compensation, i.e. β set to 1 compared to a linear reference algorithm shown with a solid line is illustrated with three exemplifying graphs in FIG. 6. As can be seen in FIG. 6, the bit rate of linear algorithm (6) remains constant for different numbers of scheduled RBs, as long as the available power is sufficient for supporting the applied service.

Figure 7:
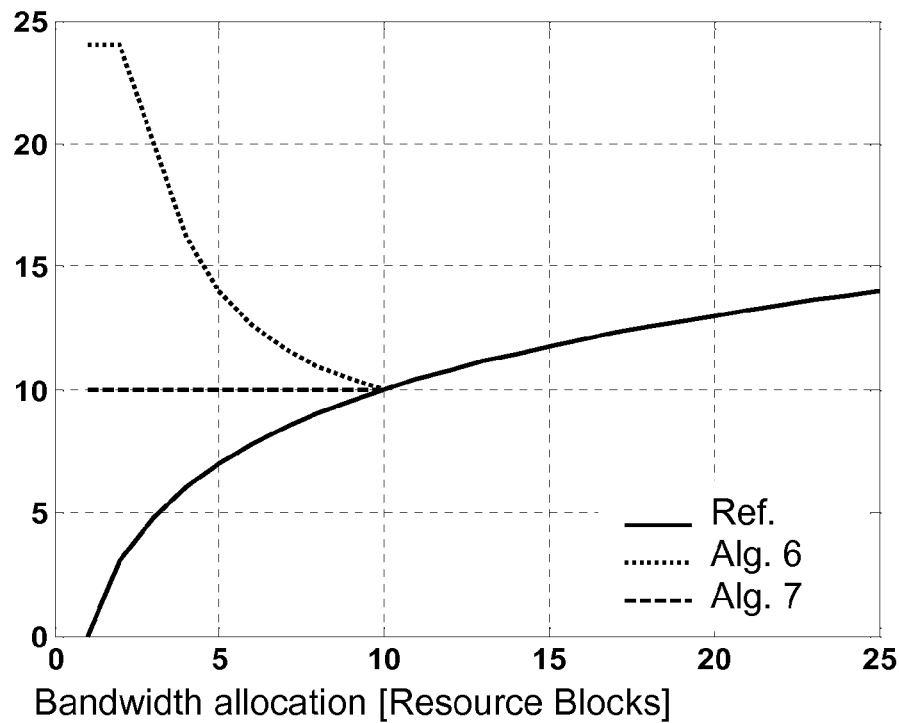
FIG. 7 is an illustration of an exemplifying simulation of the dependency of the transmit power versus the bandwidth allocation for the alternative power control modes of FIG. 6.
Figure 8:
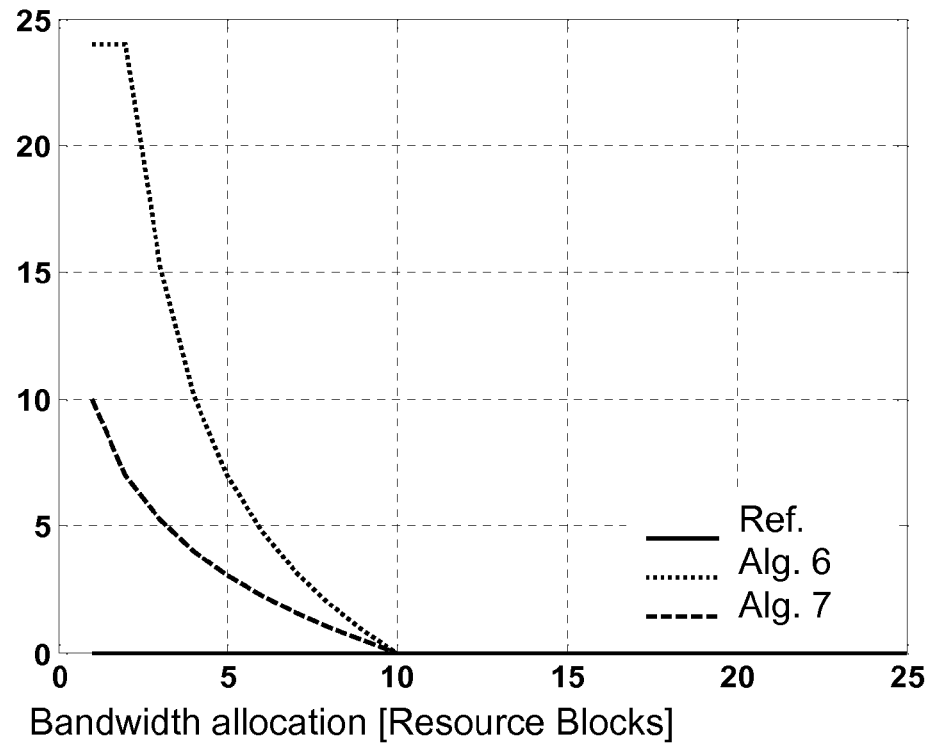
FIG. 8 is an illustration of an exemplifying simulation of the dependency of the increase of the transmit power versus the bandwidth allocation for the alternative power control modes of FIGS. 6 and 7.

FIG. 7 is another illustration which is illustrating how the total transmit power, $F_{tx}$, depends on the scheduled bandwidth for the same algorithms (6) and (7) as illustrated in FIG. 6. Also FIG. 7 comprises a reference graph, expressed as a solid line, which is representing a conventional algorithm. The required $F_{tx}$ when any of algorithm (6) or (7) is applied, is illustrated in FIG. 7. As indicated in the figure, the power remains constant also for narrow bandwidth allocations, i.e. for M<10, for algorithm 7, while non linear power boosting is applied for corresponding bandwidth allocations in order to achieve a constant bit rate for a mobile station which is applying algorithm 6. FIG. 8 is an illustration of the required increase in $F_{tx}$ when applying algorithms (6) and (7).

By applying any of the suggested algorithms, fairness between cells, and consequently also the overall network user fairness, may be improved. Use of any of the suggested algorithms typically also improves the available bit rates significantly for the users, typically referred to as cell edge users, of the mobile stations which are applying any of the alternative algorithms, without degrading system capacity. Normally these users are the users which are most severely affected by interference.

Figure 9:
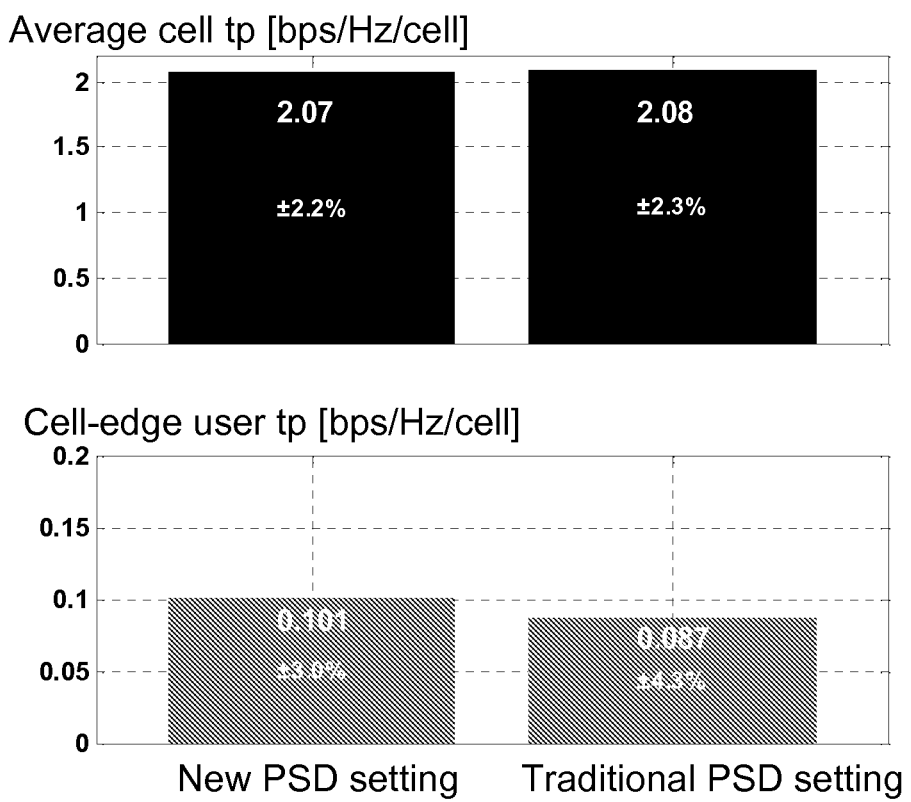
FIG. 9 is an illustration of the benefits of applying an alternative power control mode using new PSD settings, according to one exemplifying simulation.

An illustrative example of the advantage by using any of the suggested algorithms (6) or (7) is shown in FIG. 9 where according to the lower diagrams, illustrating the average cell-edge user throughput for a cell, cell-edge performance, and thereby system fairness, is improved by 16% (from 0.087 for traditional PSD setting to 0.101 for the new PSD setting), without reducing system spectral efficiency more than by 0.5% (0,01/2,08) as illustrated with the upper diagrams where the average cell throughput is shown when a new PSD setting, i.e. an alternative power boosting power control algorithm or mode is compared to a traditional PSD setting, i.e. a traditional power control algorithm or mode.

Figure 10A:
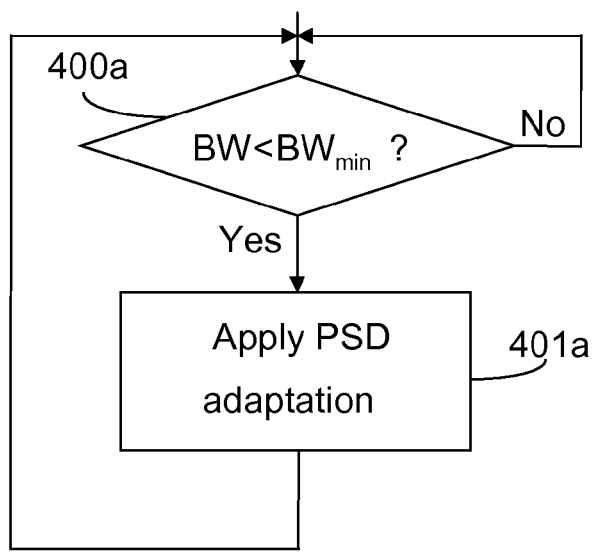
FIG. 10a is an illustration of a method for applying an alternative power control mode at a mobile station according to one exemplifying embodiment.

A method for adapting the PSD at a mobile station will now be described in general terms with reference to FIG. 10a. According to a first step 400a it is determined whether the bandwidth scheduled to the mobile station is below a minimum bandwidth, $M_{min}$, which is defining the lower threshold value from where PSD adaptation by power boosting is to be applied. If the scheduled bandwidth is below $M_{min}$, an alternative power control mode is selected, i.e. PSD adaptation according to any of the embodiments suggested above is applied, as indicated with another step 401a. As already mentioned above, the selection of an alternative power control mode may rely on more than one criterion, i.e. one or more additional criteria, in addition to the scheduled bandwidth, is decisive for determining whether a switch to an alternative power control mode is to be executed or not.

Figure 10B:
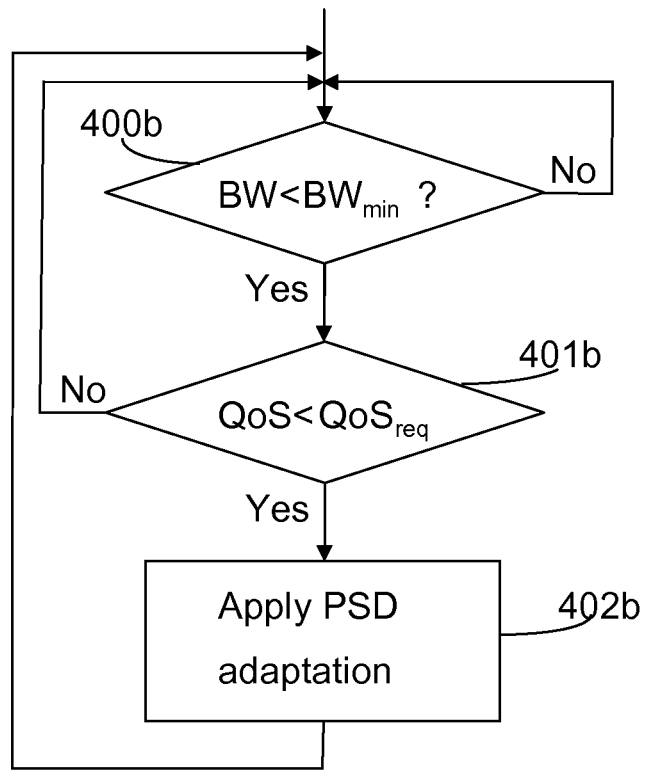
FIG. 10b is an illustration of a method for applying an alternative power control mode at a mobile station according to another embodiment.

FIG. 10b illustrates one such method where an additional switching criterion based on the available QoS is applied. According to this exemplary embodiment where, in addition to taking the scheduled bandwidth into consideration, also the available QoS is considered when determining whether or not to change to the alternative power control mode. More specifically, application of the suggested PSD adaptation is made possible by change of power control mode if the scheduled bandwidth for a mobile station is below $M_{min}$ and the available QoS is less than a predefined minimum QoS, $QoS_{req}$, which is considered to be required for a relevant service. Correspondingly, other or further criteria may be decisive when determining whether PSD adaptation according to any of the suggested alternatives is to be applied.

Figure 11:
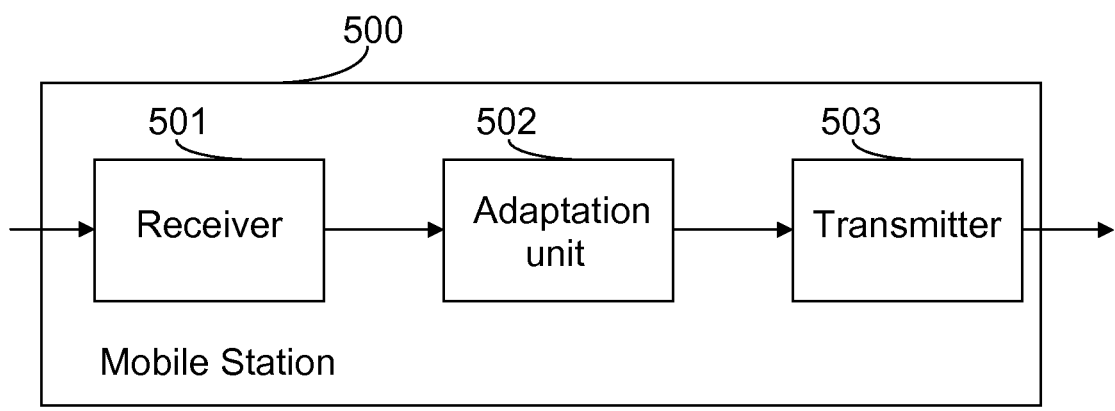
FIG. 11 is an exemplifying illustration of a mobile station which is configured to apply an alternative power control mode.

In order to enable for a mobile station to apply PSD adaptation, the mobile station needs to be adapted accordingly. FIG. 11 is a simplified illustration of a mobile station 500 which is configured to be able to selectively change from a conventional power control mode to an alternative power control mode as suggested above. Mobile station 500 comprises an adaptation unit 502 which is configured to enable the mobile station 500 to adapt the PSD of the mobile station 500 on the basis of the bandwidth scheduled to the mobile station 500 alone, or in combination with one or more additional pre-defined switching criteria.

More specifically, as suggested above, the adaptation unit 502 may be configured to determine a measure, such as e.g. the QoS of the mobile station 500 and to switch to a mode which enables adaptation of the PSD in case it is determined that both the criteria set out for the scheduled bandwidth and the QoS is fulfilled.

The adaptation unit 502 may be configured to apply a fixed transmit power boosting compensation function which enables the adaptation unit 502 to adjust the power spectrum density such that it utilizes a minimum transmit power, $F_{min}$, in case the bandwidth scheduled to said mobile station 500 is below a minimum bandwidth, $M_{min}$, or a non-linear transmit power boosting compensation function which enables the mobile station 500 to adjust the power spectrum density such that it is equal to or exceeds a minimum transmit power, $F_{min}$, may be applied.

In addition, the adaptation unit 502 may be configured to determine a grade of compensation of the PSD when applying a fixed or non-linear transmit power boosting compensation function, such that anything between no compensation at all and full compensation can be applied, depending on the circumstances.

Figure 12:
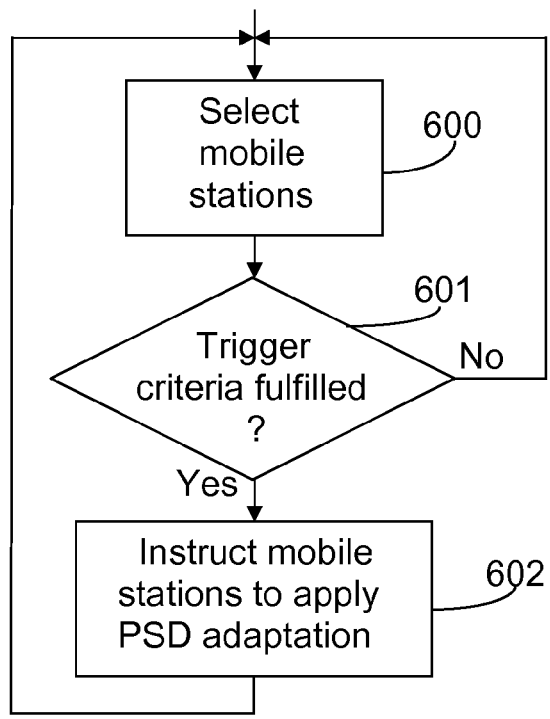
FIG. 12 is an illustration of a method for applying an alternative power control mode at a base station according to one exemplifying embodiment.

As indicated above, a method for applying alternative power control to allow for PSD compensation may instead be controlled from the serving base station. Such a method according to one exemplary embodiment will now be described with reference to FIG. 12.

If the option of using an alternative power control mode is to be restricted for a selected range of mobile stations, the mobile stations which are relevant for the consideration are first selected as indicated with a first step 600. Alternatively, all mobile stations served by the base stations are selected by default The step of selecting mobile stations may be configured according to a wide range of different criteria. According to one embodiment, mobile stations are selected on the basis of the amount of bandwidth scheduled to the mobile stations, such that e.g. only mobile stations for which a bandwidth which is below a predefined threshold has been scheduled are selected. Alternatively, the time scheduled to the mobile stations may be a switching criterion, such that e.g. those mobile stations for which the smallest amount of time has been scheduled are selected.

According to yet another alternative embodiment scheduling statistics may be considered, such that e.g. the amount of bandwidth scheduled to mobile stations is compared to the amount of bandwidth requested by the mobile stations, wherein typically the mobile stations for which the difference between requested and scheduled bandwidth is largest are selected.

Conventional power control methods normally rely on reports provided to a serving base station from served mobile stations. According to another alternative embodiment all mobile stations from which a power headroom exceeding zero has been reported, i.e. the mobile station will be able to boost the output power if required, may be selected by the base station.

In another step 601 it is determined whether a predefined trigger criterion has been fulfilled, and in such a case, all mobile stations served by the base station, or just a selected subgroup of mobile stations, are instructed to switch to a certain alternative power control mode such that PSD adaptation can be applied, as indicated in a next step 602.

The trigger of step 601 may rely on one or more predefined criteria for triggering a switch to an alternative power control mode. According to one embodiment the base station may be configured to determine the average load of the base station and to receive information on the average load of at least one neighboring base station by using any type of conventional load determining method, wherein a switch is typically executed in case the average load of the base station relative the average load of the one or more neighboring base stations exceeds a predefined load threshold, $I_{th}$.

There are situations where it is preferred not to rely on measuring results from any external entity or node. If such a method is applied, the mobile station may instead determine the average load of only the base station responsible for controlling the change of power control mode. According to this alternative embodiment, the switch to an alternative power control mode is instead triggered in case the average load of the base station exceeds the predefined load threshold, $I_{th}$.

The instructing step 602 may comprise instructing all or a selected subset of mobile stations to unconditionally switch to an alternative power control mode, i.e. the selection is base station controlled. Alternatively, instructions may provide information to all or a selected subset of mobile stations, enabling the selected mobile stations to apply an alternative power control mode on the initiative of the respective mobile stations, i.e. once a mobile station has received instructions from a serving base station, change of mode is not executed until such a decision has been taken by the mobile station. In the latter case the change of mode is mobile station controlled, wherein such a decision may be based on a variety of criteria, such as e.g. QoS.

In resemblance to the mobile station controlled method also the instructions provided from a mobile station may comprise information on a required grade of compensation, β, to be applied by the fixed or non-linear transmit power boosting compensation mode, such that full compensation for a reduced bandwidth allocation is obtained in case β=1 and such that no compensation is obtained in case β=0.

Figure 13:
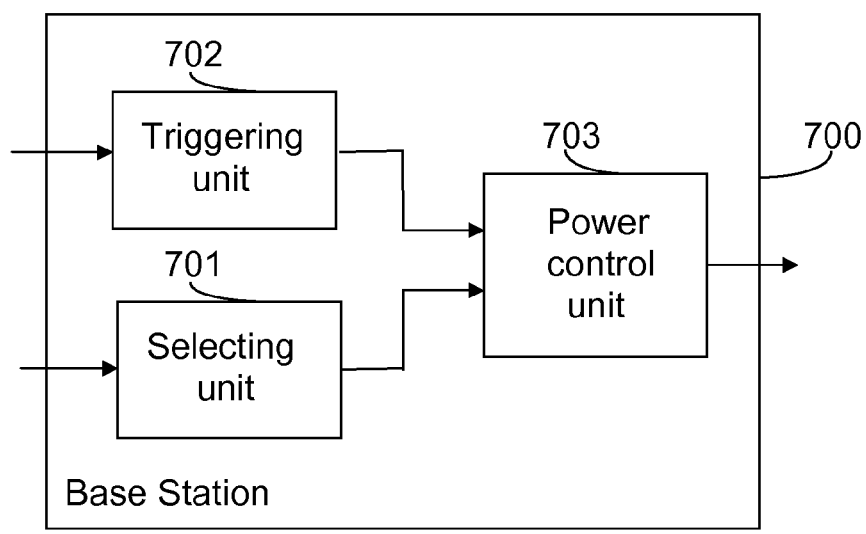
FIG. 13 is an exemplifying illustration of a base station which is configured to apply an alternative power control mode.

A simplified base station which is configured to execute a method according to any of the embodiments suggested above will now be described below with reference to FIG. 13 where base station 700 comprises a triggering unit 702 which is configured to trigger a switch to an alternative power control mode when one or more predefined trigger criteria has been fulfilled. More specifically, the triggering unit 702 is configured, to respond to the one or more trigger criteria being fulfilled by triggering a power control unit 703 to instruct at least one of the mobile stations to apply the alternative power control mode, or that the mobile stations are allowed to use the alternative power control mode.

The base station 700 may also comprise a selecting unit 701, configured to select a subgroup of mobile stations from the plurality of served mobile stations, wherein the power control unit 703 is configured to instruct only the mobile stations belonging to said selected subgroup of the option to apply an alternative power control mode, as an alternative to selecting all served mobile stations.

The selecting unit 701 may be configured to select mobile stations on the basis of a plurality of different criteria, such as e.g. on the basis of the amount of resources scheduled to served mobile stations, the time scheduled to served mobile stations, or on the basis of statistics on the amount of resources scheduled to served mobile stations compared to the amount of resources requested by the mobile stations.

The triggering unit 702 may be configured to determine the average load of the base station 700, to receive information on the average load of at least one neighboring base station, and to trigger activation of the alternative power control mode in case the average load of base station 700 relative the average load of the one or more neighboring base stations exceeds a predefined load threshold, $I_{th}$. Load determination may be executed by activation of any conventional load determining method, and thus this process will not be discussed in any further detail in this document.

Alternatively, the triggering unit 702 may be configured to determine only the average load of base station 700, and to trigger activation of the alternative power control mode in case the average load of base station 700 exceeds a predefined load threshold, $I_{th}$.

When any of the alternative power control modes are no longer required, i.e. when the conditions which resulted in a switch from a conventional power control mode to an alternative mode have stabilized the base station or the mobile station should preferably switch back to the conventional power control mode. Therefore, according to one embodiment, the base station 700, or more specifically the triggering unit 702 of the base station, is further configured to continue to consider the criteria/criterion, typically by monitoring one or more parameters, on which the switching criteria/criterion rely, such that when the conditions are back to normal, i.e. to conditions as they were before the switching, it switches back to the conventional power control mode. Accordingly, the power control unit 703 is configured to provide instructions to the selected mobile stations to switch back to the conventional power control mode when triggered to do so by the triggering unit 702.

While the invention has been described with reference to specific exemplary embodiments, the description is generally only intended to illustrate the inventive concept and should not be taken as limiting the scope of the invention, which is defined by the appended claims. Although HSDPA and LTE has been occasionally used for describing for exemplifying purposes, it is to be understood that the method and arrangement described in the present document may be applied also for configurations which rely on other standards and protocols.

The invention claimed is:

1. A method for uplink power control, performed in a mobile station served by a base station of a communications network comprising a plurality of base stations, the method comprising:
   determining whether a bandwidth scheduled to the mobile station is below a predefined minimum bandwidth, $M_{min}$; and
   in response to determining that the bandwidth is below the predefined minimum bandwidth $M_{min}$, adjusting a power spectrum density of the mobile station.

2. The method of claim 1, further comprising determining whether a Quality of Service of the mobile station is below a required Quality of Service, $QoS_{req}$, and in response to determining that the Quality of Service is below the required Quality of Service, adjusting the power spectrum density of the mobile station.

3. The method of claim 1, wherein the power spectrum density is adjusted based on a fixed power control mode that enables the mobile station to adjust the power spectrum density such that the mobile station utilizes a fixed minimum transmit power, $P_{min}$ in case the bandwidth scheduled to the mobile station is below the minimum bandwidth, $M_{min}$.

4. The method of claim 1, wherein the power spectrum density is adjusted based on a non-linear power control mode that enables the mobile station to adjust the power spectrum density such that it utilizes a transmit power that is equal to or exceeds a minimum transmit power, $P_{min}$.

5. The method of claim 1, wherein the power spectrum density is adjusted such that a minimum bit rate, $BR_{min}$, is maintained in case the bandwidth scheduled to the mobile station is below the minimum bandwidth, $M_{min}$.

6. The method of claim 1, wherein the power spectrum density is adjusted partly on the basis of a pre-defined compensation parameter, β such that full compensation for a reduced bandwidth allocation is obtained in case β=1 and such that no compensation is obtained in case β=0.

7. The method of claim 6, wherein the pre-defined compensation parameter is determined according to expected SINR to bit rate link performance.

8. The method of claim 1, wherein the instructing step further comprises instructing the mobile stations on a grade of compensation, determined by a compensation parameter, β to be applied by the alternative power control mode, such that full compensation for a reduced bandwidth allocation is obtained in case β=1 and such that no compensation is obtained in case β=0.

9. A method for performing uplink power control of a plurality of mobile stations served by a first base station of a mobile communications network comprising a plurality of base stations, the method comprising the following steps executed in the first base station:
   recognizing that one or more predefined trigger criteria to apply an alternative power control mode is fulfilled;
   instructing at least one of the mobile stations to apply the alternative power control mode, wherein the alternative power control mode enables a mobile station to adapt a power spectrum density on the basis of a bandwidth scheduled to the mobile station.

10. The method of claim 9, wherein the instructing step comprises informing all mobile stations served by the first base station of an option to change power control mode.

11. The method of claim 9, further comprising selecting a subgroup of mobile stations from the plurality of mobile stations, wherein the instructing step comprises instructing only the mobile stations belonging to the subgroup.

12. The method of claim 11, wherein the selecting step comprises selecting mobile stations on the basis of one or more of:
   the amount of bandwidth scheduled to the mobile stations,
   the time scheduled to the mobile stations,
   statistics on the amount of bandwidth scheduled to the mobile stations compared to the amount of bandwidth requested by the mobile stations, and
   mobile stations from which a power headroom exceeding zero has been reported to the first base station.

13. The method of claim 9, further comprising determining an average load of the first base station and an average load of at least one neighboring base station, wherein the trigger criteria is fulfilled in case the average load of the first base station relative the average load of the at least one neighboring base station exceeds a predefined load threshold, $L_{th}$.

14. The method of claim 9, further comprising determining an average load of the first base station, wherein the trigger criteria is fulfilled in case the average load of the first base station exceeds a predefined load threshold, $L_{th}$.

15. The method of claim 9, wherein the instructing step comprises providing instructions to the at least one mobile station to switch to the alternative power control mode.

16. The method of claim 9, wherein the instructing step comprises providing information to the at least one mobile station, enabling the at least one mobile station to apply the alternative power control mode.

17. The method of claim 9, wherein the alternative power control mode enables the at least one mobile station to apply a fixed power control mode, enabling the at least one mobile station to adapt the power spectrum density, such that a minimum transmit power, $P_{min}$, is obtained in case the bandwidth scheduled to the mobile station is below a minimum bandwidth, $M_{min}$.

18. The method of claim 9, wherein the alternative power control mode enables the at least one mobile station to apply a non-linear power control mode, enabling the at least one mobile station to adapt the power spectrum density such that a minimum transmit power, $P_{min}$, is obtained from the at least one mobile station.

19. A mobile station for performing uplink power control when served by a base station of a communications network comprising a plurality of base stations, the mobile station comprising:
   a transmitter;
   a receiver; and
   adaptation logic configured to determine whether a bandwidth scheduled to the mobile station is below a predefined minimum bandwidth, $M_{min}$, and in response to a determination that the bandwidth is below the predefined minimum bandwidth $M_{min}$, adjust a power spectrum density of the mobile station.

20. The mobile station of claim 19, wherein the adaptation logic is further configured to determine a Quality of Service of the mobile station and to adjust the power spectrum density on the basis of the bandwidth scheduled to the mobile station in case it is determined that the Quality of Service of the mobile station is below a required Quality of Service, $QoS_{req}$.

21. The mobile station of claim 19, wherein the adaptation logic is configured to apply a fixed power control mode that enables the adaptation logic to adjust the power spectrum density such that it utilizes a minimum transmit power, $P_{min}$, in case the bandwidth scheduled to the mobile station is below a minimum bandwidth, $M_{min}$.

22. The mobile station of claim 21, wherein the adaptation logic is configured to determine a grade of compensation of the power spectrum density when applying the fixed power control mode or a non-linear power control mode on the basis of a pre-defined compensation parameter, β.

23. The mobile station of claim 19, wherein the adaptation logic is configured to apply a non-linear transmit power boosting compensation function that enables the mobile station to adjust the power spectrum density such that it is equal to or exceeds a minimum transmit power, $P_{min}$.

24. A first base station of a mobile communications network comprising a plurality of base stations and configured to perform uplink power control of mobile stations served by the first base station, the first base station comprising:

a transmitter;

a receiver; and triggering logic adapted to respond to one or more predefined trigger criteria being fulfilled to trigger a power control logic to instruct at least one mobile station among the plurality of mobile stations to apply an alternative power control mode, wherein the alternative power control mode enables the at least one mobile station to adjust a power spectrum density on the basis of a bandwidth scheduled to the at least one mobile station.

25. The first base station of claim 24, further comprising selecting logic configured to select a subgroup of mobile stations from among the plurality of mobile stations, wherein the power control logic is configured to provide the instructions to the mobile stations belonging to the selected subgroup.

26. The first base station of claim 25, wherein the selecting logic is configured to select mobile stations on the basis one or more of:

an amount of resources scheduled to the mobile stations, a time scheduled to the mobile stations, statistics on the amount of resources scheduled to the mobile stations compared to the amount of resources requested by the mobile stations, and mobile stations from which a power headroom exceeding zero has been reported to the first base station.

27. The first base station of claim 25, wherein the selecting logic is configured to select all mobile stations served by the first base station.

28. The first base station of claim 25, wherein the selecting logic is configured to instruct the selected mobile stations to switch to the alternative power control mode.

29. The first base station of claim 25, wherein the selecting logic is configured to provide information to the selected mobile stations, which enables the selected mobile stations to apply the alternative power control mode.

30. The first base station of claim 24, wherein the triggering logic is further configured to determine an average load of the first base station and an average load of at least one neighboring base station, and to trigger the power control logic to transmit the instructions in case the average load of the first base station relative the average load of the at least one neighboring base station exceeds a predefined load threshold.

31. The first base station of claim 24, wherein the triggering logic is further configured to determine an average load of the first base station, and to trigger the power control logic to transmit the instructions in case the average load of the first base station exceeds a predefined load threshold.

* * * * *